United States Patent [19]
Stecher

[11] 3,712,647
[45] Jan. 23, 1973

[54] PIPE CONNECTION
[75] Inventor: Friedhelm Stecher, Burscheid, Germany
[73] Assignee: Goetzewerke Friedrich Goetze AG, Burscheid, Germany
[22] Filed: Nov. 24, 1970
[21] Appl. No.: 92,407

[30] Foreign Application Priority Data
Nov. 28, 1969 Germany.....................P 19 59 666.8

[52] U.S. Cl. ....................285/318, 285/341, 285/348
[51] Int. Cl. ..................................................F16l 39/00
[58] Field of Search......285/318, 341, 343, 337, 413, 285/414, 348, 354, 363, DIG. 11; 277/235 B, 235 A, 236

[56] References Cited

UNITED STATES PATENTS

| | | | |
|---|---|---|---|
| 2,779,610 | 1/1957 | Risley | 285/348 X |
| 1,984,806 | 12/1934 | Pfefferle | 285/DIG. 11 |
| 1,711,995 | 5/1929 | Erickson | 285/318 |
| 3,575,428 | 6/1969 | Fuhrmann | 277/235 B |

FOREIGN PATENTS OR APPLICATIONS

| | | | |
|---|---|---|---|
| 559,013 | 2/1944 | Great Britain | 285/343 |
| 493,163 | 5/1953 | Canada | 285/348 |
| 274,909 | 9/1964 | Netherlands | 285/DIG. 11 |

*Primary Examiner*—Dave W. Arola
*Attorney*—Spencer & Kaye

[57] ABSTRACT

A releasable pipe connection has a pair of pipe ends engaging in one another so that one pipe end acts as a sleeve for the other pipe end. Once together, the pipe ends define a wedge-shaped groove. An annular helical coiled spring is arranged in the groove so as to serve as a clamping ring, and a flange ring is fastened to the one part and acts as a sleeve to clamp the helical coiled spring in the groove. The coils of the helical coiled spring may have circular or non-circular cross sections, and may be used in conjenction with a separate sealing ring, or may serve as a combination sealing and clamping ring by being provided with at least a partial jacket constructed from a suitable material.

4 Claims, 8 Drawing Figures

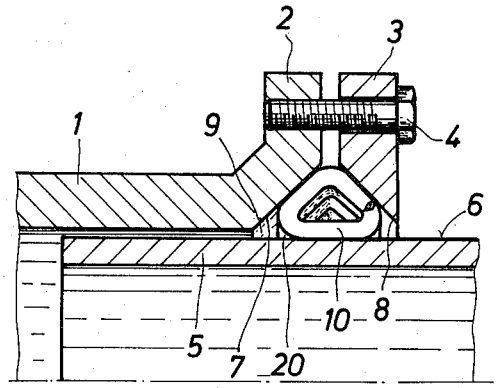
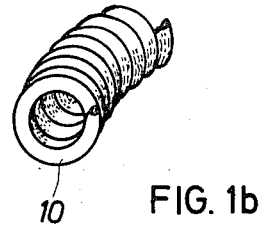
FIG. 1a
FIG. 1b
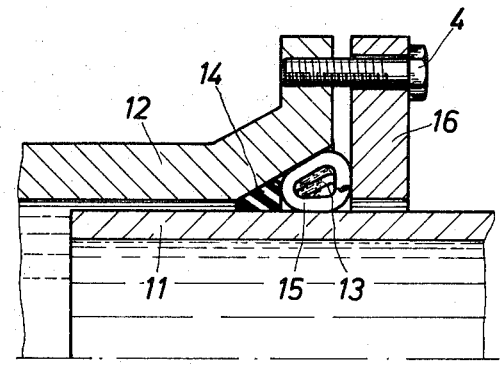
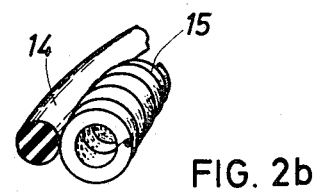
FIG. 2a
FIG. 2b
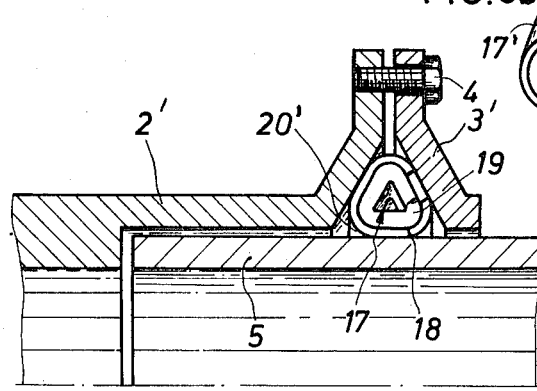
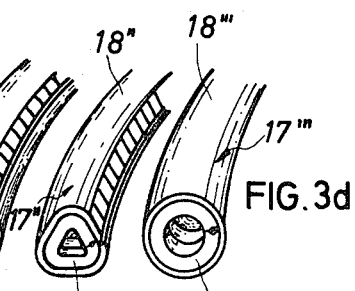
FIG. 3a
FIG. 3b  FIG. 3c  FIG. 3d
Inventor
Friedhelm Stecher
By *Spencer & Kaye*
Attorneys.

PIPE CONNECTION

BACKGROUND OF THE INVENTION

The present invention relates to a releasable connection for pipe ends which are pushed one into the other and having a clamping ring which is axially clamped in a wedge-shaped groove formed between the pipe ends. Pipe connections are well known that have pipe ends which are pushed together, one pipe end acting as a sleeve for the other pipe end, and where preferably the inner surface of the pipe end having a larger diameter is an oblique surface arranged such that a wedge-shaped groove for holding a clamping ring and, if required, a sealing ring is formed. Such an arrangement is shown in German Pat. No. 1,247,087, published Aug. 10, 1967. With such pipe connections, the clamping of both pipe ends occurs by means of a flange ring which presses the clamping ring axially into the decreasing groove space between the two pipe ends; the axially applied clamping force producing a radial force component in the process. Depending on the configuration of the clamping ring, and particularly depending on the selection of the material for the clamping ring, a clamping is produced due to the increased friction between the clamping ring and the pipe end walls, or a form-fitting connection is produced by a deformation of the cross section of the clamping ring.

The use of helical coiled spring rings as the elastic core for sealing of container covers, as shown in German Pat. No. 452,642, or other flange-type connections — see, for example, German Pat. No. 1,216,634 — in which the spring is stressed substantially perpendicularly to the spring axis, is known.

For pipe connections achieved entirely by clamping, elastically and/or plastically deformable soft-material packings are known which are sometimes metallically reinforced. An example of such packings can be found in U. S. Pat. No. 3,179,446 issued Apr. 20, 1965 to Robert N. Paterson. This patent shows a sealing connection in which the pointed end of a wedge-shaped sealing ring constructed from a soft material is reinforced with a helical spring ring which is intended to prevent the soft material from flowing into the gap to be sealed when the sealing ring is clamped in place.

Such arrangements can usually be easily detached, but can not be used in all cases, because either the thermal stressability of the rubber-type soft material packings is too low, or because soft material packings of, for example, asbestos fibers lack the required level of natural elasticity for a durable strong connection.

In the also widely known ring blade connections, a metallic ring constructed from a hard material and with a sharp inner cutting edge is radially pressed into the jacket surface of the inner pipe end during clamping. In this way, a form-fitting connection is produced which can not always be easily undone. Also, such a connection requires close manufacturing tolerances for the pieces to be connected, since the massive cross section of the cutting blade can be changed only over a relatively narrow range.

SUMMARY OF THE INVENTION

It is an object of the present invention to provide a clamping connection for a pair of pipe ends to be pushed one into the other which can withstand high thermal stresses, can be used for the transfer of greater tension or impression forces from one pipe end to the other and at the same time spans a wider range of tolerances for fits in a compensating manner.

This is accomplished according to the present invention in that the clamping ring is an annular coil spring. The use of an annular coil spring as the clamping ring combines the positive characteristics of all previously known clamping rings into a single ring.

Since the helical coiled springs are generally constructed from a metallic material, they can withstand high thermal stresses. Moreover, their high natural elasticity with respect to the deformability of the spring cross section and with a constant cross-sectional area — in contradistinction to the compressible soft material rings — has a positive effect for spanning great dimensional deviations between the pipe ends to be clamped together without an extremely high compressive force being required. Particularly advantageous for a force-transmitting connection is the dot or line contact of the individual spring coils with the circumferential areas of the pipe ends, since high pressures occur at the points of contact which might cause a partial burying of individual spring turns in the usually softer material of the pipe ends. The latter produces an additional form-fitting connection. With the high pressure stressability along the axes of the pipe ends of the cross section of the helical coiled spring, an absolutely firm pipe connection which can be highly stressed in tension and in compression is assured.

None of the prior art devices discussed above shows the use of a helical spring ring as a clamping ring clamped in a wedge-shaped groove, nor do they even mention the advantages of the dependable, temperature resistant connection which can be realized with such a clamping ring.

A further feature of the present invention proposes that the coil spring have a circular coil cross section in the unclamped state, since such coil springs can be fabricated particularly easily. It is possible also, however, and advisable in some cases, to design the coil cross section to be adapted to the wedge-shaped groove cross section; that is approximately a triangle.

It is basically unimportant to the present invention whether the pipe connection serves only for transmitting mechanical forces — for example, in switching rods formed of tubes — or whether the pipes contain gaseous or liquid media. In the latter case it is quite possible to place a known sealing ring of a softer material ahead of the proposed clamping ring, the sealing ring receiving the required compression via the clamping ring. It is particularly advantageous if the sealing ring encloses the helical coiled spring cross section at least partially, so that even with higher pressures of the medium the sealing ring is continuously pressed to the sealing surfaces of the pipe ends under the influence of the spring bias and, thus, can not be lifted away therefrom. Preferably a metallic sealing ring is used which is in the form of a V- or C-shaped profiled metal strip. It is also possible for the sealing ring to consist of a pipe formed into an annulus and which completely encloses the annular helical coiled spring. The high adaptability of a combined clamping and sealing ring will not be lost in this arrangement.

The combined clamping and sealing connection comprising a further embodiment of the present invention has been successfully employed in, for example, exhaust systems of internal-combustion engines. With such pipe connections the clamping and sealing connection is subjected to vibratory stresses in addition to the thermal and static stresses.

BRIEF DESCRIPTION OF THE DRAWINGS

FIG. 1a is a partial cross-sectional view of a pipe connection according to the present invention which has one clamping ring.

FIG. 1b is a perspective view of a part of the clamping ring of FIG. 1a in its unclamped state.

FIG. 2a is a partial cross-sectional view of a sealed pipe connection according to the present invention which has one sealing ring and one clamping ring.

FIG. 2b is a perspective view of a part of the sealing ring and clamping ring of FIG. 2a in their unclamped state.

FIG. 3a is a partial cross-sectional view of a sealed pipe connection according to the present invention which has a combination clamping and sealing ring.

FIGS. 3b – 3d are perspective views of a part of combination clamping and sealing rings having different cross-sectional configurations.

DESCRIPTION OF THE PREFERRED EMBODIMENTS

The pipe connection shown in FIG. 1a consists of a pipe end 1 with a flange 2 against which a flange ring 3 can be clamped by means of, for example, bolts or screws 4. A second pipe end 5, which has a smaller diameter than the pipe end 1, extends into pipe 1. Pipe end 1 acts as a sleeve for pipe end 5. A wedged-shaped groove 20 is formed between the pipe ends 1 and 5. Between the outer surface 6 of the pipe 5 and the two oblique surfaces 7, 8 of flange 2 and flange ring 3, respectively, is defined a double-conical space 9 for holding a clamping ring 10. The latter consists of an annular helical coiled spring with closely adjacent coils of circular cross section, as shown in FIG. 1b. When the clamping ring 10 is axially clamped over the two oblique surfaces 7, 8, the elastic deformation property of the clamping ring cross section produces a strong, high contact-pressure between the clamping ring and the surface 6 of the inner pipe end 5, and, thus, an accurate friction seal is assured.

The pipe connection shown in FIG. 2a is a sealed clamp connection. The connection differs from that shown in FIG. 1a in that a known sealing ring 14, as well as a clamping ring 15 according to the present invention, are provided in a unilaterally wedge-shaped groove 13 formed between two pipe ends 11, 12. Sealing ring 14 is constructed from a known resilient material, such as a suitable elastomer. During clamping, the flange ring 16 presses onto clamping ring 15 and the latter presses onto the sealing ring 14. FIG. 2b shows a portion of both rings in their unclamped state.

The pipe connection according to FIG. 3a corresponds substantially to that according to FIG. 1a, and has a pipe end 2' and a flange ring 3'. The combination clamping and sealing ring 17 which is employed in this embodiment, however, consists of a helical coiled spring 19 the coils of which are enclosed either completely or partially by a jacket 18 and which may be constructed from, for example, a suitable metal. The coils of ring 17 may have a circular cross section as well as a cross section corresponding to a groove 20'.

The cross sections of a series of combination clamping and sealing rings 17' – 17'' are shown in FIGS. 3b – 3d. In FIG. 3b the coils of a helical coiled spring ring 19' are partially enclosed by a jacket 18' constructed from, for example, a suitable metal and having a C-shaped cross section. In FIG. 3c the coils of helical coiled spring ring 19'' have a triangular cross section and are surrounded by a strip 18'' having a V-shaped profile and constructed from, for example, a suitable metal. FIG. 3d shows helical spring 19''' arranged in a closed pipe, or tube, 18''', which may be constructed from, for example, a suitable metal. Tube 18''' completely surrounds spring 19''' in a sleeve-like manner.

Although jacket 18–18''' have been set out as constructed of a suitable metal, it is to be understood that any known, suitable material may be used to construct the jackets.

It will be understood that the above description of the present invention is susceptible to various modifications, changes and adaptations, and the same are intended to be comprehended within the meaning and range of the equivalents of the appended claims.

I claim:

1. A releasable pipe connection comprising a pair of pipe ends engaging in one another, one pipe end acting as a sleeve for the other pipe end and together the pipe ends defining a wedge-shaped groove, an annular helical coiled spring, having coils that define a circular cross section when unbiased, positioned in the groove so as to serve as a clamping ring, a sealing means disposed on said coiled spring, said sealing means being constructed of metal and having a C-shaped cross section when unbiased and which at least partially encloses the coils of said helical coiled spring, and means for clamping said helical coiled spring and said sealing means in said wedge-shaped groove and against the surfaces of said pipe ends together by means of the contact pressure between said helical coiled spring, said sealing means, and said pipe ends.

2. A releasable pipe connection comprising a pair of pipe ends engaged in one another, one pipe end acting as a sleeve for the other pipe end and together the pipe ends defining a wedge-shaped groove, an annular helical coiled spring, having coils that define a circular cross section when unbiased, positioned in the groove so as to serve as a clamping ring, a sealing ring separate from said clamping ring arranged in said wedge-shaped groove so as to be retained therein by said helical coiled spring, and means for clamping said helical coiled spring in said wedge-shaped groove and against the surfaces of said pipe ends defining said grooves to connect said pipe ends together by means of the contact pressure between said helical coiled spring and said pipe ends.

3. A releasable pipe connection comprising a pair of pipe ends engaging in one another, one pipe end acting as a sleeve for the other pipe end and together the pipe ends defining a wedge-shaped groove, an annular helical coiled spring, having coils that define a circular cross section when unbiased, positioned in the groove so as to serve as a clamping ring, a sealing means disposed on said coiled spring, said sealing means being constructed of metal and having a V-shaped cross section when unbiased and which at least partially encloses the coils of said helical coiled spring, and means for clamping said helical coiled spring and said sealing means in said wedge-shaped groove and against the surfaces of said pipe ends together by means of the contact pressure between said helical coiled spring, said sealing means, and said pipe ends.

4. A releasable pipe connection comprising a pair of pipe ends engaging in one another, one pipe end acting as a sleeve for the other pipe end and together the pipe ends defining a wedge-shaped groove, an annular helical coiled spring, having coils that define a circular cross section when unbiased, positioned in the groove so as to serve as a clamping ring, a sealing means which is a tube, of circular cross section when unbiased, disposed on said helical coiled spring to completely surround it in a sleeve-like manner, and means for clamping said helical coiled spring and said tube in said wedge-shaped groove and against the surfaces of said pipe ends defining said groove to connect said pipe ends together by means of the contact pressure between said helical coiled spring, said tube, and said pipe ends.

* * * * *